United States Patent [19]

Hayashi

[11] 3,718,626
[45] Feb. 27, 1973

[54] POLYESTERS DERIVED FROM 5-PENTANOLIDES

[75] Inventor: Katsumi Hayashi, Mentor, Ohio

[73] Assignee: The Lubrizol Corporation, Wickliffe, Ohio

[22] Filed: Feb. 22, 1971

[21] Appl. No.: 117,729

Related U.S. Application Data

[63] Continuation-in-part of Ser. No. 88,164, Nov. 9, 1970.

[52] U.S. Cl. ................................................260/78.3
[51] Int. Cl. ............................................C08g 17/017
[58] Field of Search......................................260/78.3

[56] References Cited

UNITED STATES PATENTS

| | | | |
|---|---|---|---|
| 2,962,524 | 11/1960 | Hostettler et al. | 260/484 |
| 3,021,309 | 2/1962 | Cox et al. | 260/78.3 |
| 3,021,314 | 2/1962 | Cox et al. | 260/78.3 |
| 3,021,317 | 2/1962 | Cox et al. | 260/78.3 |
| 3,477,998 | 11/1969 | Nakahara et al. | 260/78.3 |

OTHER PUBLICATIONS

Chem. Abstracts 53, 11234i (1959)

*Primary Examiner*—William H. Short
*Assistant Examiner*—E. A. Nielsen
*Attorney*—Roger Y. K. Hsu, William H. Pittman, James W. Adams, Jr. and James V. Tura

[57] ABSTRACT

Polyesters are prepared by the condensation of 5-pentanolides (delta-valerolactones) in the presence of an alkaline reagent. These polyesters may be extended with polyisocyanates.

1 Claim, No Drawings

POLYESTERS DERIVED FROM 5-PENTANOLIDES

This application is a continuation-in-part of copending application Ser. No. 88,164 filed Nov. 9, 1970.

This invention relates to new compositions of matter and methods for their preparation. More particularly, it relates to polyesters having repeating units of the formula

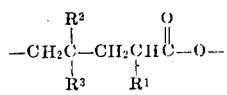

wherein each of $R^1$ and $R^2$ is hydrogen or a hydrocarbon or substituted hydrocarbon radical and $R^3$ is a hydrocarbon or substituted hydrocarbon radical.

The term "hydrocarbon radical" as used herein includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substitutents may together form a cycloalkyl radical.

The following are illustrative of hydrocarbon radicals within the scope of this invention. Where a named radical has several isomeric forms (e.g., butyl), all such forms are included.

| | |
|---|---|
| Methyl | Benzyl |
| Ethyl | Cyclohexyl |
| Propyl | Cyclopentyl |
| Butyl | Methylcyclopentyl |
| Hexyl | Cyclopentadienyl |
| Octyl | Vinylphenyl |
| Decyl | Isopropenylphenyl |
| Vinyl | Cinnamyl |
| Allyl | Naphthyl |
| Ethynyl | Propargyl |
| Phenyl | |
| Tolyl | Xylyl |

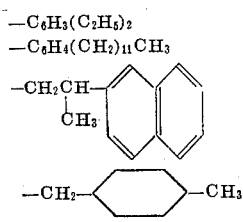

Many obvious variations of these radicals will be apparent to those skilled in the art and are included within the scope of the invention.

Substituted hydrocarbon, alkyl, aryl, etc., radicals are considered fully equivalent to the hydrocarbon, alkyl, aryl, etc., radicals and to be part of this invention. By "substituted" is meant radicals containing substituents which do not alter significantly the character or reactivity of the radical. Examples are:

Halide (fluoride, chloride, bromide, iodide)
Hydroxy
Ether (especially lower alkoxy)
Keto
Ester (especially lower carbalkoxy)
Aminoacyl (amide
Nitro
Cyano
Thioether
Sulfoxy
Sulfone
Sulfonic acid ester
Sulfonamide In general, no more than about three such substituent groups will be present for each 10 carbon atoms in the radical.

The hydrocarbon or substituted hydrocarbon radicals represented by $R^1$, $R^2$ and $R^3$ in the compositions of this invention are usually free from ethylenic and acetylenic unsaturation and have no more than about 30 carbon atoms, desirably no more than about 12 carbon atoms. They are preferably lower hydrocarbon radicals, especially lower alkyl and aryl radicals, (most often alkyl), the word "lower" denoting radicals containing up to seven carbon atoms. Still more preferably, at least one of $R^1$ and $R^2$ is hydrogen, the other is hydrogen or a lower alkyl radical and $R^3$ is a lower alkyl radical, both lower alkyl radicals usually being methyl or ethyl.

The polyesters of this invention may be obtained by condensing, in the presence of an alkaline reagent, a 5-pentano-lide of the formula

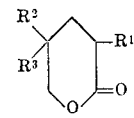

wherein $R^1$, $R^2$ and $R^3$ are as previously defined. These 5-pentanolides (delta-valerolactones) are known in the art. A typical method for their preparation is disclosed and claimed in the aforementioned copending application Ser. No. 88,164, filed Nov. 9, 1970.

The condensation of the 5-pentanolide is effected in an anhydrous medium in the presence of a small amount of the alkaline reagent which may be an alkyllithium, an alkali metal hydride, amide, alkoxide or the like. It is frequently convenient merely to mix the reactants and allow the exothermic reaction to proceed, although it may sometimes be advisable to use a relatively non-polar solvent such as ethyl ether, tetrahydrofuran, dioxane, ethylene or diethylene glycol dimethyl ether or the like. The reaction temperature is ordinarily between room temperature and about 70° C.

The polyesters of this invention may be extended by reacting them with a diisocyanate of the formula OCN—Z—NCO, wherein Z is a divalent hydrocarbon or substituted hydrocarbon radical, preferably an aromatic or alkylaromatic radical. Typical diisocyanates which may be used are toluene diisocyanate, naphthalene diisocyanate and diphenylmethane diisocyanate.

Preparation and extension of the polyesters of this invention are illustrated by the following examples. All parts are by weight unless otherwise indicated. Specific viscosities are measured at 30° C. on a solution of 0.5 gram of the compound in 100 ml. of chloroform.

EXAMPLE 1

A mixture of 415 grams of 4,4-dimethyl-5-pentanolide and 6 ml. of a 1.6 M solution of n-butyllithium in n-hexane is shaken, whereupon an exothermic reaction occurs and the mixture solidifies. After standing overnight, the solid is dissolved in 700 ml. of chloroform and precipitated by pouring the chloroform solution into methanol. The precipitate is collected by filtration, washed with methanol and water, dried and precipitated again from chloroform by methanol. The resulting polyester has a specific viscosity in chloroform of 0.23.

EXAMPLE 2

A mixture of 10 grams of the polyester of Example 1 and 0.5 gram of diphenylmethane diisocyanate is heated in a nitrogen atmosphere to 145° C. at a pressure of 0.5 torr for 18 hours. There is obtained an isocyanate-extended polyester having a specific viscosity in chloroform of 0.57.

EXAMPLE 3

Following the procedure of Example 2, an isocyanate-extended polyester is prepared from 10 grams of the polyester of Example 1 and 0.2 gram of toluene diisocyanate. It has a specific viscosity of 0.68.

EXAMPLE 4

Following the procedure of Examples 1-3, a polyester is prepared from 2,4-dimethyl-5-pentanolide and extended with toluene diisocyanate.

The polyesters and extended polyesters of this invention have uses typical of chemically similar polyesters. In particular, they may be drawn into fibers or used to form films, coatings, molding compounds and the like.

What is claimed is:

1. A solid polyester consisting essentially of repeating units of the formula

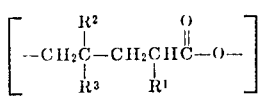 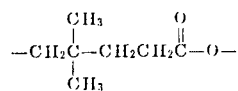

* * * * *